(12) United States Patent
Ping

(10) Patent No.: US 7,421,600 B2
(45) Date of Patent: Sep. 2, 2008

(54) POWER SAVING METHOD

(75) Inventor: Te-Lin Ping, Tao-Yuan (TW)

(73) Assignee: Silicon Integrated Systems Corp., Hsin-Chu (TW)

( * ) Notice: Subject to any disclaimer, the term of this patent is extended or adjusted under 35 U.S.C. 154(b) by 438 days.

(21) Appl. No.: 11/192,499

(22) Filed: Jul. 29, 2005

(65) Prior Publication Data

US 2007/0028128 A1    Feb. 1, 2007

(51) Int. Cl.
*G06F 1/26* (2006.01)
*G06F 1/32* (2006.01)

(52) U.S. Cl. .................................... 713/320

(58) Field of Classification Search ............... 713/300, 713/320, 322, 500, 501, 600
See application file for complete search history.

(56) References Cited

U.S. PATENT DOCUMENTS

| | | | | |
|---|---|---|---|---|
| 5,218,704 A | * | 6/1993 | Watts et al. ................ | 713/322 |
| 5,550,637 A | * | 8/1996 | Murakami ................... | 358/296 |
| 5,615,376 A | * | 3/1997 | Ranganathan ............... | 713/322 |
| 6,633,905 B1 | * | 10/2003 | Anderson et al. ........... | 709/219 |
| 6,678,834 B1 | * | 1/2004 | Aihara et al. ............... | 713/501 |
| 6,732,280 B1 | * | 5/2004 | Cheok et al. ................ | 713/300 |
| 2004/0128569 A1 | * | 7/2004 | Wyatt et al. ................. | 713/300 |
| 2007/0083782 A1 | * | 4/2007 | Ping .......................... | 713/320 |

* cited by examiner

*Primary Examiner*—Mark Connolly
(74) *Attorney, Agent, or Firm*—Squire, Sanders & Dempsey, L.L.P.

(57) ABSTRACT

A power-saving method of continuous display and effective cost in a system that includes memory directly accessed by a CPU and at least one display device within vertical blanking. The method includes the following steps: issuing a Power-saving related message; dropping the Power-saving related message, wherein a Power-saving related flag is not set; setting the Power-saving related flag; setting a VID/FID pending bit in the CPU, wherein the vertical blanking of the display/displays occurs and clearing the Power-saving related flag, wherein the Power-saving related flag is set, and executing a power saving process.

8 Claims, 7 Drawing Sheets

POWER SAVING METHOD

BACKGROUND OF THE INVENTION

1. Field of the Invention

The present invention relates to a power-saving method, and more particularly to a power-saving method of setting a Power-saving related flag.

2. Description of the Prior Art

The computer is one of the most popular tools that have been closely involved in human daily life. Almost all professions rely on the computer to make their work more efficient and easier. As the usage of computer grows even further, the need for a higher performance computer is likewise growing and getting bigger. More functions and more capacities are built into a single computer chip, and the clock speed of a central processing unit in a computer increases from the range of mega ($10^6$)/second to the range of giga ($10^9$)/second within few years. Not only the layout of computer hardware has become more complicated than before, but the coding of computer software application also has grown from millions of lines to billions of lines of code. The achievement of more functions, greater speed, and less power consumption presents a challenge for the designing of a modern computer.

Conflicts are usually found in saving computer power consumption while trying to maintain the computer performance. Higher processing speed and more complex calculation always mean more power consumption. However, not all computer applications require high processing speed and consume large system resources all the time. Dynamically adjusting system operating clock and system resources, thereby reducing system power consumption based on the needs of a computer application is a clever design to keep the system performance high and save the system power consumption at the same time. The following paragraphs first provide computer display background knowledge, illustrate some common computer system display architectures by examples, and then introduce computer power saving mechanisms and computer system display problems caused by the power saving mechanisms.

With graphic-intensive applications, high quality image data are required to be displayed correctly and with precision on a monitor device without any blinking, jittering, or delays. An amount of several megabytes image data needs to be dumped onto a monitor device per second to accomplish a continuous error free video-on-demand application. Such a graphic-intensive application can be a high-end computer-aided drafting (CAD) application, a multimedia game, MPEG (Moving Picture Experts Group) video playback, video conference, or one of many other real-time video applications. Typically, a graphic-intensive application contains a huge amount of image data that needs to be timely displayed onto a monitor device. Every complete screen of graphic information, known as a frame, has to be displayed precisely in time to avoid display blinking and jittering; as a result, the graphic processing mechanism needs to decode the image data fast enough. For instance, with a 640 times 480 pixels (horizontal times vertical), 32 bits true color, and 30 frames per second graphic application without compression, its image processor needs to process 36.864 megabytes image data per second to be able to display correctly. Moreover, as the typical resolution of a computer display has increased from 640 times 480 pixels to 800 times 600 pixels, 1024 times 768, 1280 times 1024 and beyond, and color information per pixel from 2 bits to 24 bits, 32 bits, and beyond, the processing speed and stability of a image processor also need to be increased multiplicatively.

Typically, to increase the image processing speed, a computer relies on a graphics processing unit, or a standalone graphics card (GFX, also known as a video card, graphic accelerator card, or a display adapter, etc.) to do graphics display on a monitor device. A graphics card usually contains a specialized processor or processors that are tailor-made for graphic rendering, and a set of memory ranging from one, two, four, eight, or sixteen megabytes and up, so that image frames can be stored in the graphics card. Thus, the set of memory installed in a graphic card is commonly known as a frame buffer.

A graphics card or a graphics processing unit can be built into a standalone chipset as demonstrated in FIG. 1, or it can be integrated into an existing chipset as depicted in FIG. 2. Referring to FIG. 1, a computer system 10 comprises a CPU 11, a system chipset 12, a data-path chipset 13, a system memory 14, a graphics processing unit 15, a frame buffer 16, display device 17, 19 and 20, and a built-in memory controller 18 inside the system chipset 12. The system chipset 12 is commonly referred to as North Bridge (NB), and the data-path chipset 13 is commonly referred to as South Bridge (SB). Each of the display devices can be a Cathode Ray Tube (CRT), a Liquid Crystal Display (LCD), or any other advanced monitors. As a contrast to FIG. 1, in FIG. 2, a graphics processing unit 27 is integrated into the system chipset 22. And the placements of the CPU 21, the system memory 24, the memory controller 26, the data-path chipset 23, the system chipset 22, and display devices 25, 28 and 29 are similar to FIG. 1.

Usually, graphics information that is going to be displayed onto the display device is first stored in the system memory, and then transferred to a first-in-first-out (FIFO) buffer. A FIFO buffer display mechanism can make a request to access a system memory, and fill up its FIFO buffer with the graphic information. To a better explanation, the FIFO buffer display mechanism may be appreciated by a water tank analogy. Similar to water draining out from the bottom of a water tank at a constant rate and occasionally refilling from the top of the water tank, the FIFO display mechanism dumps image data to a display device at an invariant rate, and every so often receives image data from the system memory. Both the standalone graphics processing unit (as depicted in FIG. 1) and the on-chipset graphics processing unit (as depicted in FIG. 2) can directly access the system memory through the memory controller in the system chipset. In other words, the request of a system memory access can be made by the graphics processing unit (or the graphics card) without going through the CPU.

In addition to the computer system architectures demonstrated in FIG. 1 and FIG. 2, there are other computer system architectures in use. For instance, two of those computer system architectures are presented in FIG. 3 and FIG. 4. In FIG. 3, computer system architecture 30 is similar to the standalone graphics processing unit computer system 10 shown in FIG. 1 except that a system memory 34 is directly connected to a CPU 31 via a built-in memory controller 38. As the same in FIG. 4 and FIG. 2, both computer system architectures have their graphics processing units built into the system chipset, but in FIG. 4, the memory controller 46 is inside the CPU 41 and the system memory 44 is directly coupled to the CPU 41 via the built-in memory controller 46. Note that with the computer system architectures sketched in FIG. 3 and FIG. 4, a system memory access requested by the graphics processing units has to go through not only the system chipset but also the CPUs.

The increase of CPU workload often demands an increase in power consumption and results in a shorter battery life. The increased power consumption may cause a fatal problem to an application running on a mobile computer unit or a laptop computer. As a consequence, a variety of power saving techniques is introduced to the design of modern computers. A couple of power saving techniques are described as follows. When a CPU idles for a predetermined period of time, the CPU clock speed is reduced and the CPU power supply is turned off. Furthermore, instead of turning the CPU on and off, a mechanism that detects the power consumption level of an application several times every second and self-adjusts the CPU clock rate and power supply level to reduce power consumption is built into a computer. As a result, with the use of the power saving techniques, a battery can last longer and the capacity of a battery may be reduced to achieve the same performance.

Typically, a few microseconds to tens of microsecond is required to process the power saving mechanism. For instance, a range of ten microsecond of time is needed to detect the power consumption level of an application, and adjusts the CPU clock rate accordingly. During the execution of power saving mechanism, the CPU is completely idle and waits for the next alternative CPU clock rate to operate. Upon the CPU idle period, the graphics card or the graphics processing unit presented in FIG. 3 and FIG. 4 cannot access the memory controller that is built inside the CPU to obtain the required image/graphics data from the system memory. As the graphics processing unit cannot access the image/graphics data from system memory and in order to display smoothly, the solution will be increasing the frame buffer. However, the frame buffer costs a lot and by adding frame buffer will reduce the product competition in the market. The present invention provides a breakthrough solution to the conflict between power saving and continuous images/graphics data display in a modern computer design. And also, the present invention achieves the cost down.

SUMMARY OF THE INVENTION

In view of the above description, an object of the present invention provides a method for saving power.

It is another object of the present invention for saving power with continuously displaying when the processor enters non-responding period.

It is still another object of the present invention to provide a method for reducing the display FIFO buffer and for multiple displays, the display FIFO will reduce more. A method of power-saving in a system is provided of the present invention. The method includes issuing a Power-saving related message, dropping the Power-saving related message when a Power-saving related flag is not set. Then, a Power-saving related flag is set by setting a Power-saving related bit. The Power-saving related flag is cleared when a power saving process is executed.

DESCRIPTION OF THE PREFERRED EMBODIMENTS

The present invention provides a power saving method. Some of the embodiments of the present invention will be described in detail and clearly as follows. Otherwise, for easily understanding and clarifying the invention, the parts of the illustration is not depicted in corresponding scale. Some scales and related ratio has been exaggerated, and the unrelated parts have not fully shown for the concise drawing. However, except for the detailed description, the invention can widely apply in others. And the invention is not limited here but the claims.

The present invention identifies a method for saving power. An embodiment of the present invention saves power while continuous displaying on display devices in a system that includes memory directly accessed by a CPU and at least one display within vertical blanking. In practice, a computer system has a limited system bandwidth to run more than one display device in high resolution at the same time. However, in a design of a modern computer, the system bandwidth may be big enough to support multiple display devices concurrently running in high-resolutions. To meet a possible future need and a complexity of the contemporary computer display infrastructure, the present invention provides a power saving method for an uninterrupted image/graphics display on a multiple display devices computer system during a non-responding period of a central processing unit (CPU) while executing a power saving process, and without constraint on a resolution of each display device and on the number of display devices hooked up to the computer system. In the other words, the present invention does not depend on the system bandwidth or the number of display devices. As long as a system bandwidth is allowed, by using the present invention, a user may hook up as many display devices as desired and as higher display resolution as possible on each of the display devices to a computer system to have continuous display during the CPU non-responding period while executing the system power saving process. Also, the present invention does not limit in the types of the display devices, such as: cathode radio tube (CRT) types, liquid crystal display (LCD) types, plasma types and other advanced types. Otherwise, the personal projectors, the office projectors and even the cinema projectors are included, too.

Figure 1:
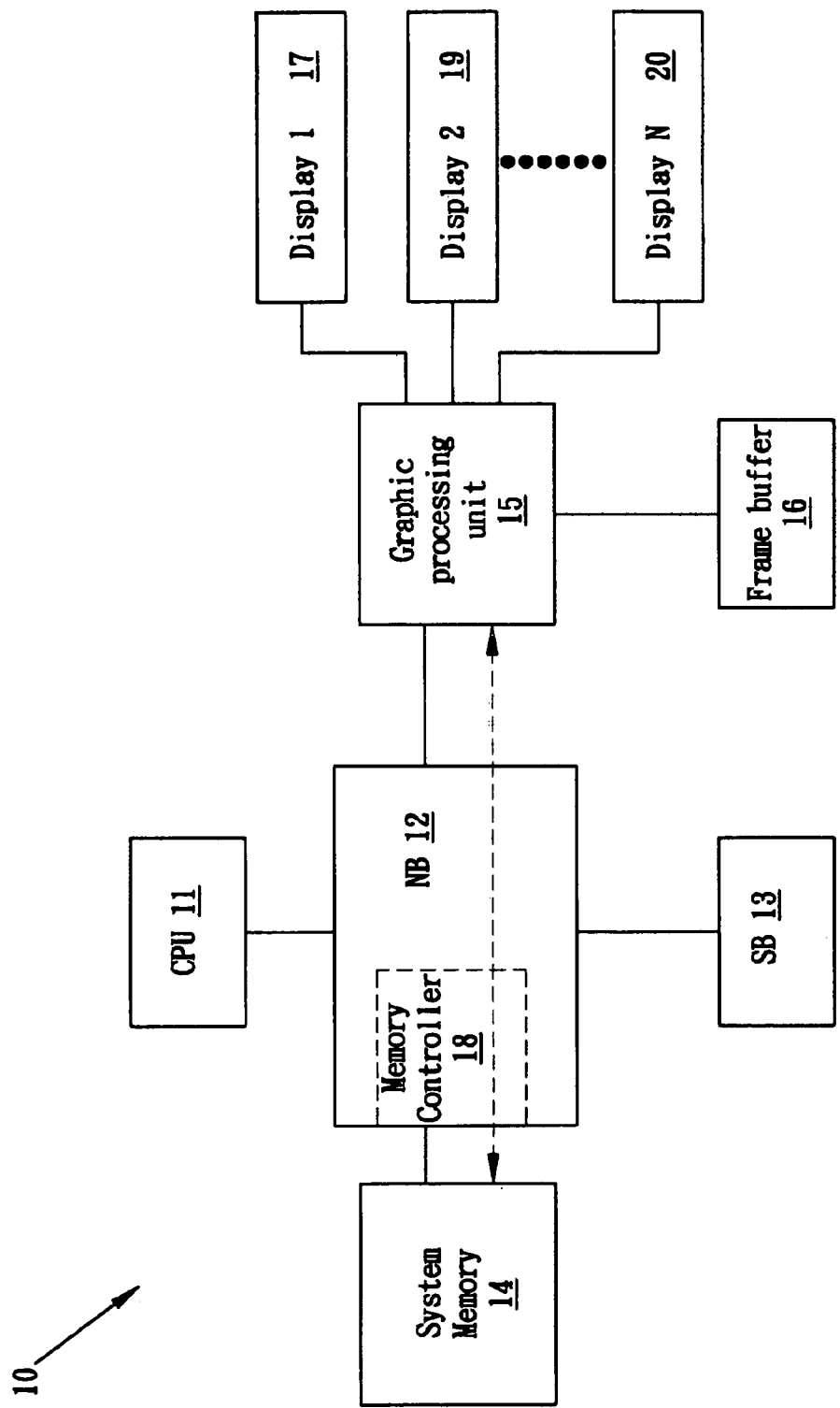
FIG. 1 is a block diagram depicting a conventional computer system in which its graphic processing unit is standalone from the north bridge.
Figure 2:
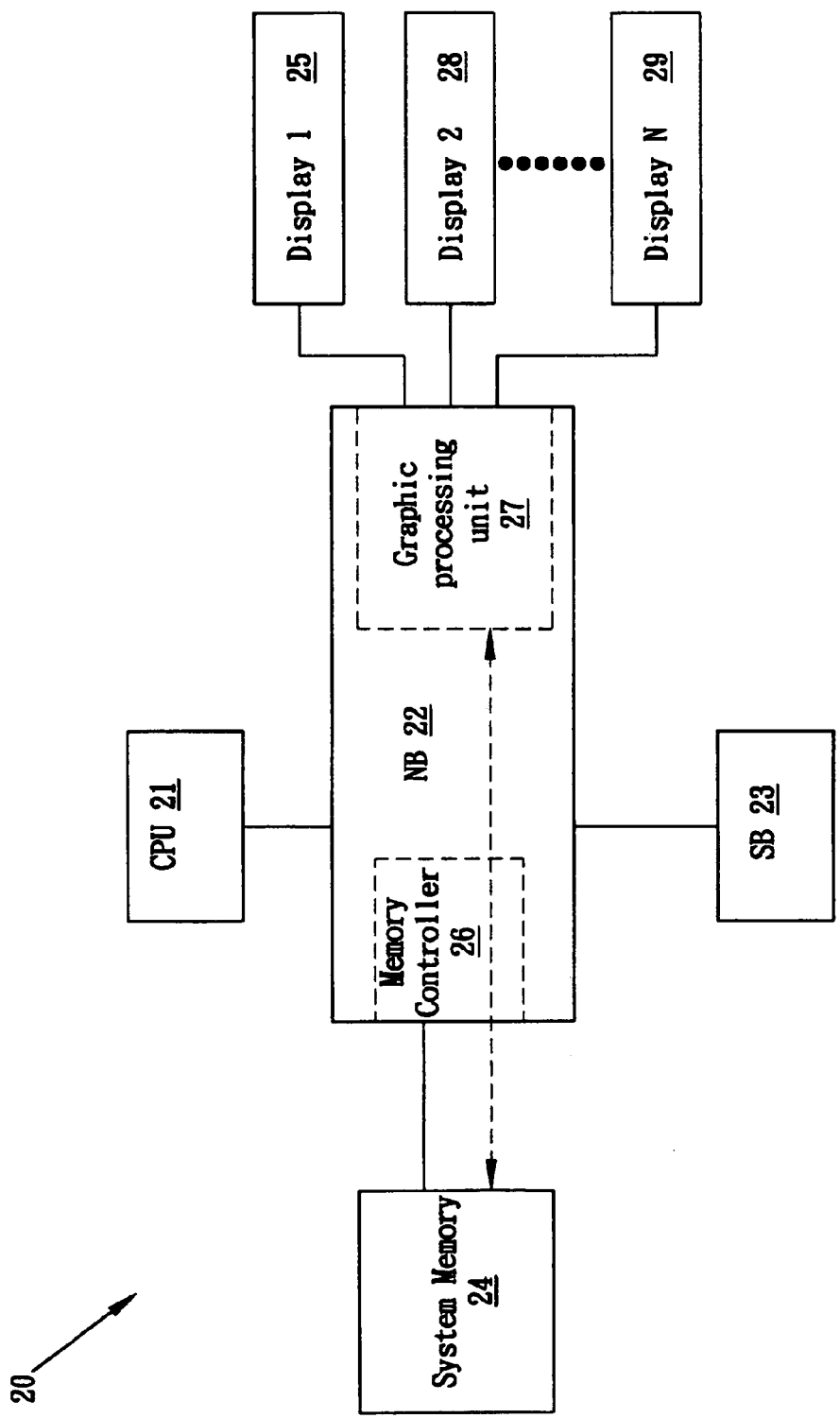
FIG. 2 is a block diagram that demonstrates a conventional computer system in which its graphic processing unit is built inside the north bridge.
Figure 3:
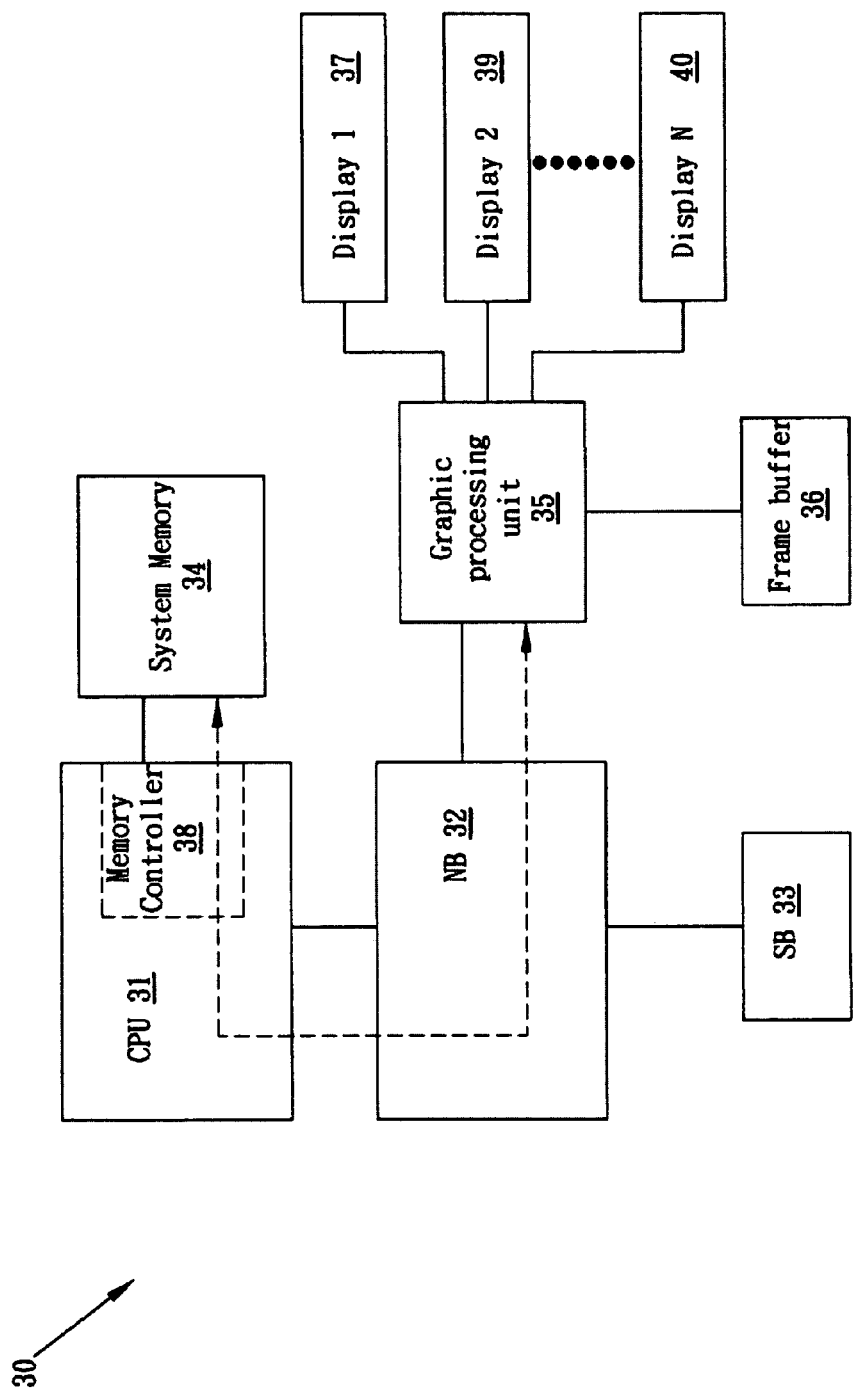
FIG. 3 is a block diagram showing a conventional computer system in which its graphic processing unit is standalone from the north bridge and with the memory controller built inside the central processing unit.
Figure 4:
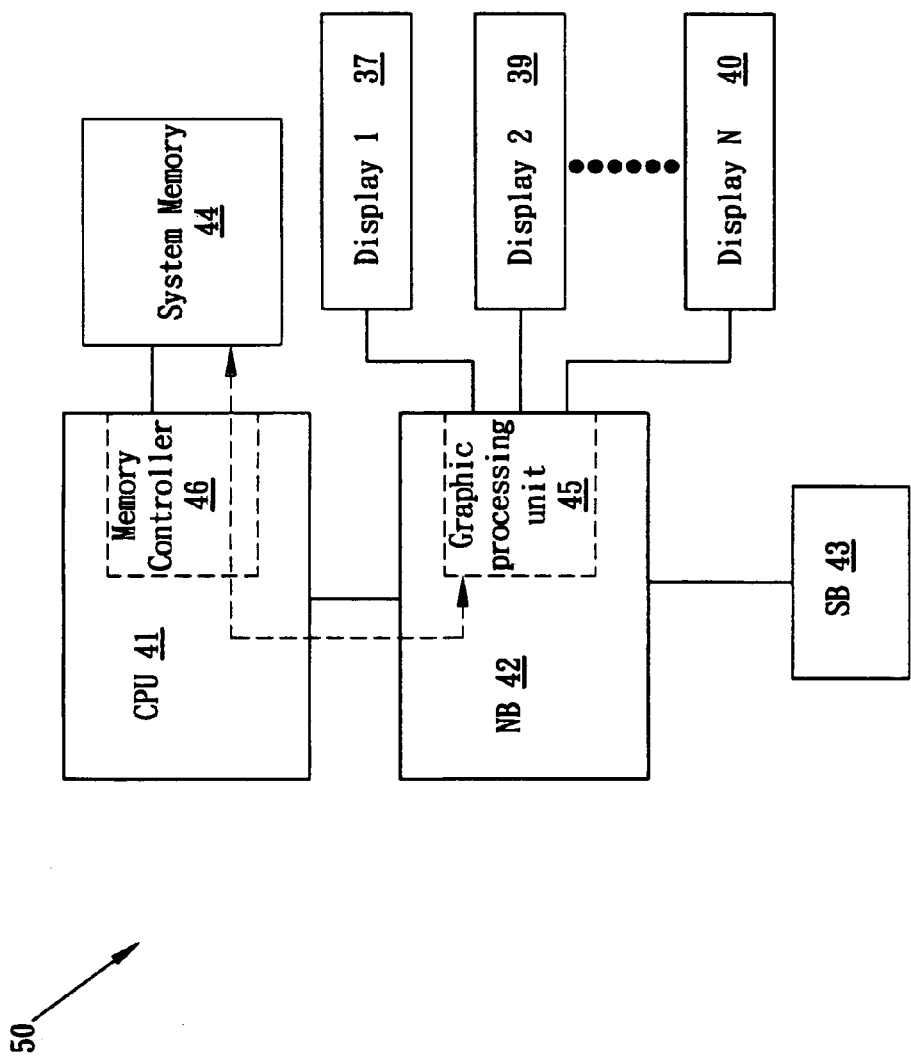
FIG. 4 is a block diagram sketching a conventional computer system in which its graphic processing unit is built inside the north bridge and with the memory controller built inside the central processing unit.

Regardless a layout of the system, the present invention provides an image/graphics data display mechanism for continuously displaying on a multiple display devices, especially in a computer system that contains a system memory directly accessed by the CPU during the CPU non-responding period while executing the power saving process. For instance, the present invention can be utilized in a computer system presented in FIG. 3 or in FIG. 4 to have an uninterrupted image display during the CPU non-responding periods for power saving. The mechanism that the present invention provides works well in the case of a graphics processing unit outside a north bridge (NB) as depicted in FIG. 3, and it works equally well in the case of a graphics processing unit inside a north bridge (NB) as depicted in FIG. 4.

Figure 5:
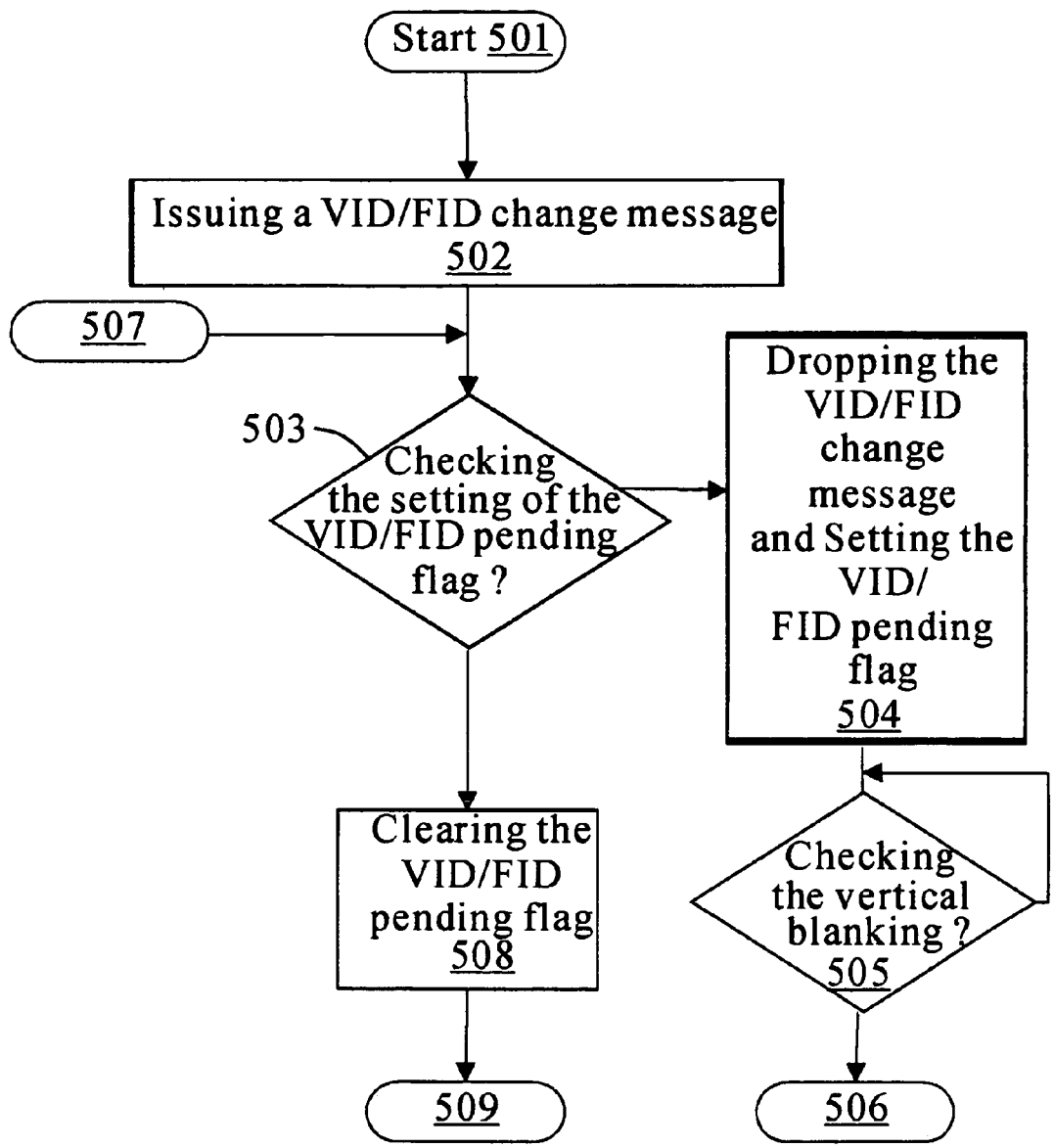
FIG. 5 is a flow chart diagram demonstrates an operation flow of the preferred embodiment of the present invention.
Figure 6:
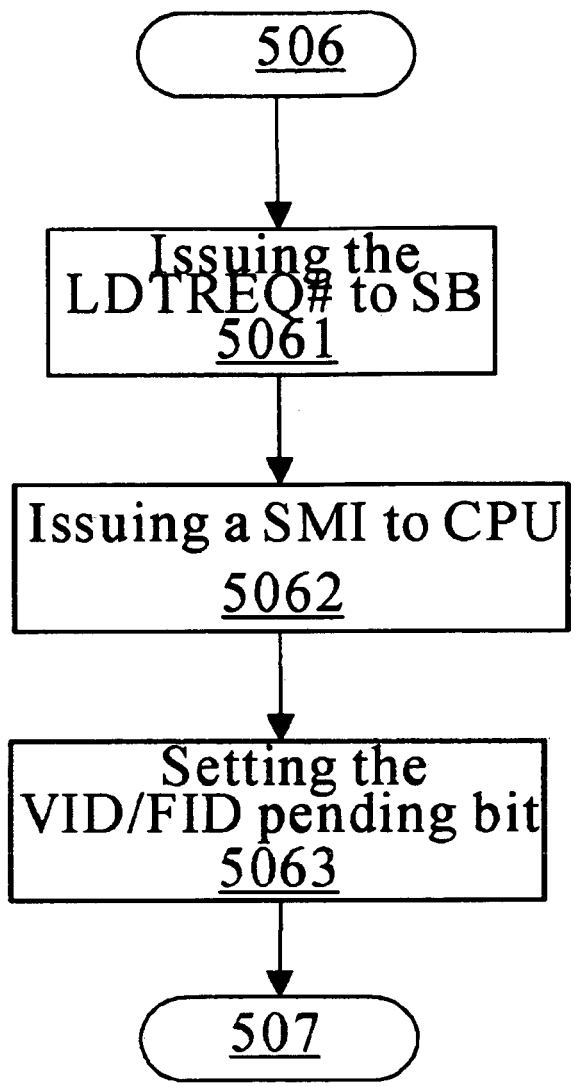
FIG. 6 is a flow chart diagram demonstrates an operation flow of the preferred embodiment of the present invention following the FIG. 5.
Figure 7:
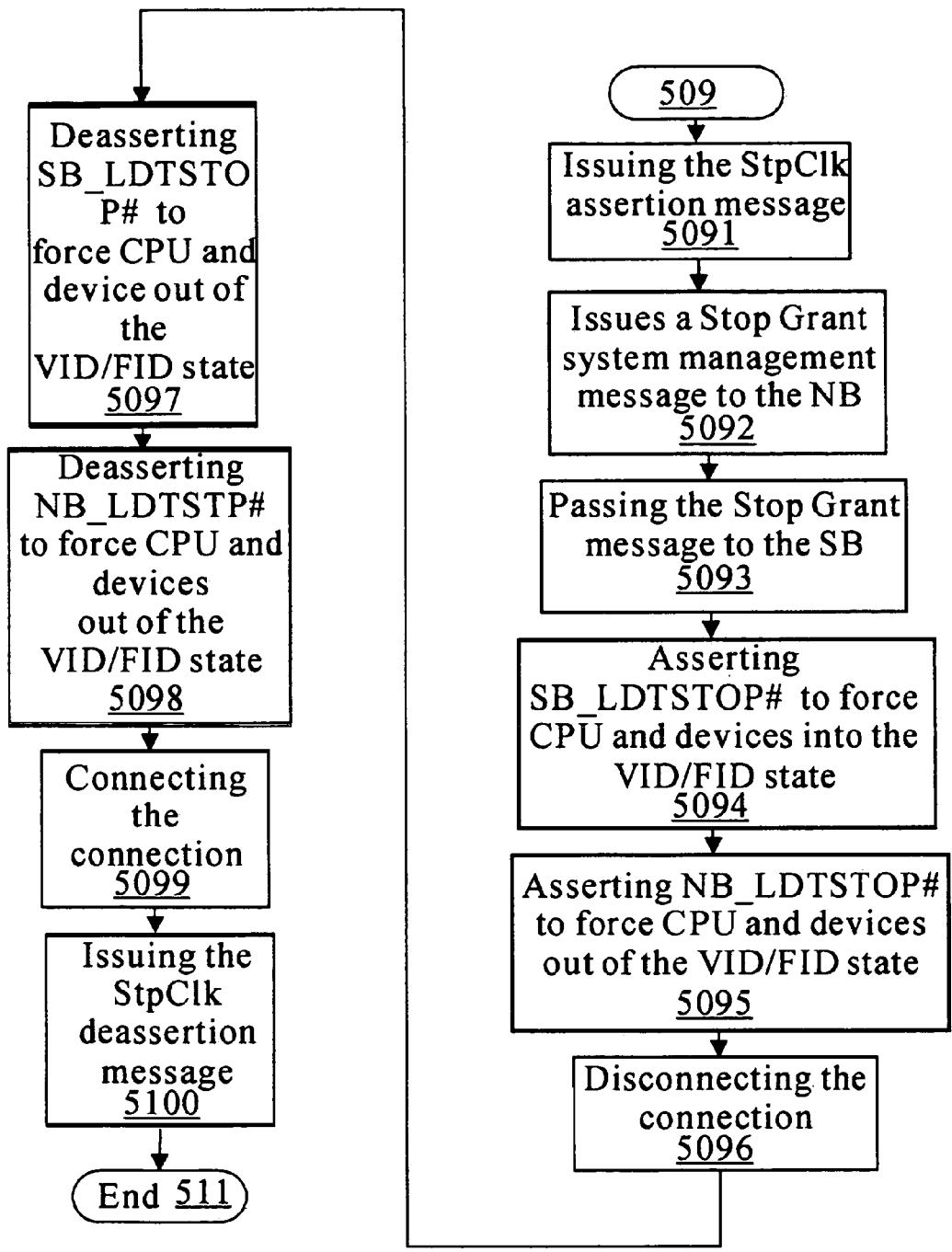
FIG. 7 is a flow chart diagram demonstrates an operation flow of the preferred embodiment of the present invention following the FIG. 5.

FIG. 5 to FIG. 7 show flow charts of the preferred embodiments of the present invention. By FIG. 5, the step 502 is a step for showing that the processor issues a Power-saving related message, e.g. a voltage ID changing message or a frequency ID changing message. The Power-saving related message of this embodiment is initiated by the CPU according to current CPU utilization for saving power. The Power-saving related message may cooperate with the basic input/output system (BIOS) and the operating system (OS). The BIOS provides possible, states of the system and the OS dynamically changes states based on the necessities of current running applications and system software. After the CPU issues the Power-saving related message, the following step 503 is a step for checking the status of a Power-saving related flag, e.g. a VID/FID pending flag, wherein the process for setting the Power-saving related flag is described hereinafter. The Power-saving related flag of this embodiment is built-in NB, and is used to avoid the Power-saving related message blocking other following requests from the CPU. Furthermore, following the design issue, the peripheral component interface (PCI) programming rule is defined in the standard that all the requests in queue follow the first in first out (FIFO) rule. If the first request in queue cannot be consumed, the following requests cannot be executed. Based on the FIFO rule, if the Power-saving related flag is not set, the following step 504 is a step for dropping the Power-saving related message for not blocking other requests and for setting the Power-saving related flag for remembering that the Power-saving related message has been issued.

The step 505 is a step for informing when the Power-saving related message could be executed. The power-saving related message of the present invention can be executed when the vertical blanking happens. It is noted that the types and the numbers of the display are not limited. Of course, the resolutions of displays are not limited, either. However, the numbers and the resolution of the displays indeed influence the vertical blanking. In this embodiment, all displays can use the synchronized clock and the implementing of the synchronized clock can use the same phase lock loop (PLL) for all displays. By adapting the synchronized clock, the vertical blanking of displays can easily occur in a fixed period. If all the vertical blanking of the displays occurs, go to the step 506.

FIG. 6 is a flow chart diagram of an embodiment of the present invention for describing the process for setting the Power-saving related flag during the steps of FIG. 5. The step 506 through the step 507 shows an example of how the CPU set a Power-saving related bit, e.g. a VID/FID pending bit, for presenting the Power-saving related flag in detail. The step 5061 is a step for issuing a request of line-disconnected. For example, the NB issues a request to the SB via the LDTREQ# channel connected with the general purpose input/output (GPIO) interface. The following step 5062 is a step for generating a request of system-management-interrupt. For example, the SB generating the system management interrupt (SMI) request to the NB and the NB passes the SMI to the CPU. The SMI service routine forces the CPU to be out of any other power saving states to avoid possible complex or conflict issues. The step 5063 is a step for setting the Power-saving related bit. For example, the VID/FID pending bit is set inside the CPU. The VID/FID pending bit is set for informing the CPU that the system is ready to run the VID/FID change (VID/FID transition). In one embodiment, the CPU driver polls the VID/FID pending bit and if the VID/FID pending bit is not set, the CPU driver will keep polling until the VID/FID pending bit set. The above steps 506 to 507 just show one of the embodiments to set the VID/FID pending bit inside the CPU. However the invention is not limited. Other embodiments may modify different steps to set the Power-saving related bit inside different elements, e.g. a VID/FID pending bit is set inside the NB or SB.

After the Power-saving related bit is set, e.g. after the VID/FID pending bit is set, go to the step 507. Regarding FIG. 5, the step 507 returns flow to the step 503 and it checks the Power-saving related flag again. Once the Power-saving related flag is set and go to the step 508. The step 508 is a step for clearing the Power-saving related flag.

It's noticed that, the Power-saving related flag may utilize one or more pending bits to indicate whether the Power-saving related flag is set. In one embodiment, the Power-saving related flag composes of only one bit, and the Power-saving related flag is regarded as being set when the bit is currently assigned to a binary "1" (or "0"). In an another embodiment, the Power-saving related flag may compose of several bits, and the Power-saving related flag will be regarded as being set when numbers of set bits exceed a pre-defined value (e.g. the Power-saving related flag includes 4 bits, and the flag is considered as "being set" if there are more than 2 bits assigned to binary "1" (or "0")). Furthermore, the Power-saving related flag may record the numbers of the issued Power-saving related messages, and the flag is regarded as being set when the frequencies of the issued Power-saving related messages exceed a pre-defined times. It's therefore the ways indicative of whether the Power-saving related flag is set are not limited in the present invention.

FIG. 7 shows a flow chart of an embodiment illustrating a sequence of power saving process. However, the sequence is not limited in the embodiment. A different CPU has its own application and the protocol to communicate with other devices. The embodiment from the step 5091 to the step 5100 is only a preferred embodiment.

The step 5091 shows that the SB responds by sending STPCLK assertion system management message to the NB and the NB passes the STPCLK assertion system management message from SB to CPU. The step 5092 illustrates that the CPU receives the STPCLK assertion system management message and responses to broadcast a STOP GRANT system management message down to the NB. The step 5093 shows that the NB passes the STOP GRANT system management message to the SB. And the step 5094 and 5095 demonstrate that the SB asserts SB_LDTSTOP# and the NB asserts NB_LDTSTOP#, respectively, after receiving the STOP GRANT system management message in a system-specific time. Herein, the SB and the NB are going in VID/FID state and they are ready to disconnect the host link. In one embodiment, the host link between the CPU and the NB and between the NB and the SB are called HyperTransport (HT). The step 5096 shows that the host link is disconnected. The step 5097 and 5098 illustrate that after a specific time, the SB and the NB will re-link the host link by sending the SB_LDTSTOP# de-assertion message and the NB_LDTSTOP# de-assertion message, respectively. Then, the step 5099 shows that after the CPU receiving all the LDTSTOP# de-assertion messages, the host link will be re-connected.

Issuing the STPCLK de-assertion message 5100 shows that the SB issues the STPCLK de-assertion message to the NB and the NB passes it to the CPU. Finally, after the STPCLK de-assertion message is received by the CPU, the CPU goes out of the VID/FID state. Thus the power can be saved.

Furthermore, Step 502 of another embodiment is a step for setting the advanced configuration and power interface (ACPI) register in NB if the system is an ACPI-defined system. The Power-saving related flag is used to avoid the ACPI access register blocking other following requests from the CPU. The following step 503 also checks the status of the Power-saving related flag after accessing the ACPI register. The Power-saving related flag of first embodiment is built-in NB. However, it also can be built-in different elements of the other embodiments, e.g. SB or the graphic processing unit.

Although the description discloses the preferred embodiment herein, it is not limit the spirit of the invention. It is intended that the specification and examples to be considered as exemplary only, with a true scope and spirit of the invention being indicated by the following claims.

What is claimed is:

1. A method of continuous display and effective cost in a system that includes memory directly accessed by a CPU and at least one display within vertical blanking, the method comprising:
    issuing a VID/FID change message;
    dropping said VID/FID change message, wherein a VID/FID pending flag is not set;
    setting said VID/FID pending flag;
    setting a VID/FID pending bit in the CPU, wherein the vertical blanking of said display/displays occur;
    clearing said VID/FID pending flag, wherein said VID/FID pending flag is set; and
    executing a power saving process.

2. The method according to claim 1, wherein said step of setting said VID/FID pending flag is setting inside the north bridge, the south bridge or the CPU.

3. The method according to claim 1, wherein said step of setting said VID/FID pending bit in the CPU further comprising:
    issuing a LDTREQ# to a south bridge; and
    issuing a system management interrupt service routine to the CPU.

4. The method according to claim 1, wherein said step of executing said power saving process further comprising:
    issuing a STPCLK assertion message;
    issuing a STOP GRANT system management message;
    asserting a SB_LDTSTOP#;
    asserting a NB_LDTSTOP#;
    disconnecting a host link;
    de-asserting a SB_LDTSTOP#;
    de-asserting a NB_LDTSTOP#;
    connecting said host link; and
    issuing a STPCLK de-assertion message.

5. A method of continuous display and effective cost in a system that includes memory directly accessed by a CPU and at least one display within vertical blanking, the method comprising:
    setting the advanced configuration and power interface register in north bridge;
    dropping said advanced configuration and power interface register, wherein a Power-saving related flag is not set;
    setting said Power-saving related flag;
    setting a VID/FID pending bit in the CPU, wherein the vertical blanking of said display/displays occur;
    clearing said Power-saving related flag, wherein said Power-saving related flag is set; and
    executing a power saving process.

6. The method according to claim 5, wherein said step of setting said Power-saving related flag is setting a VID/FID pending bit inside the north bridge, the south bridge or the CPU.

7. The method according to claim 5, wherein said step of setting said VID/FID pending bit in the CPU further comprising:
    issuing a LDTREQ# to a south bridge; and
    issuing a system management interrupt service routine to the CPU.

8. The method according to claim 5, wherein said step of executing said power saving process further comprising:
    issuing a STPCLK assertion message;
    issuing a STOP GRANT system management message;
    asserting a SB_LDTSTOP#;
    asserting a NB_LDTSTOP#;
    disconnecting a host link;
    de-asserting a SB_LDTSTOP#;
    de-asserting a NB_LDTSTOP#;
    connecting said host link; and
    issuing a STPCLK de-assertion message.

* * * * *